(12) United States Patent
Jones et al.

(10) Patent No.: US 8,147,192 B2
(45) Date of Patent: Apr. 3, 2012

(54) DUAL STAGE TURBINE SHROUD

(75) Inventors: Daniel Vern Jones, Fairfield, OH (US); James Harvey Laflen, Cincinnati, OH (US); Richard William Albrecht, Fairfield, OH (US); Dustin Alfred Placke, Cincinnati, OH (US); Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 768 days.

(21) Appl. No.: 12/233,847

(22) Filed: Sep. 19, 2008

(65) Prior Publication Data
US 2010/0074745 A1 Mar. 25, 2010

(51) Int. Cl.
*F01D 5/20* (2006.01)
*F01D 11/08* (2006.01)
(52) U.S. Cl. .................. 415/209.3; 415/173.1
(58) Field of Classification Search ............... 415/173.1, 415/173.2, 173.3, 189, 190, 209.3, 209.2
See application file for complete search history.

(56) References Cited

U.S. PATENT DOCUMENTS

| | | | |
|---|---|---|---|
| 3,583,824 A | 6/1971 | Smuland et al. | |
| 4,573,867 A | 3/1986 | Hand | |
| 5,169,287 A | 12/1992 | Proctor et al. | |
| 5,273,396 A | 12/1993 | Albrecht et al. | |
| 6,155,778 A | 12/2000 | Lee et al. | |
| 6,340,285 B1 | 1/2002 | Gonyou et al. | |
| 6,354,795 B1 | 3/2002 | White et al. | |
| 7,052,235 B2 | 5/2006 | Alford et al. | |
| 7,147,432 B2 | 12/2006 | Lowe et al. | |
| 7,296,967 B2 | 11/2007 | Shapiro | |
| 7,740,444 B2 * | 6/2010 | Lee et al. | 415/173.1 |
| 2008/0127491 A1 | 6/2008 | Lee et al. | |
| 2008/0131259 A1 | 6/2008 | Lee et al. | |
| 2008/0131260 A1 | 6/2008 | Lee et al. | |
| 2008/0131261 A1 | 6/2008 | Lee et al. | |
| 2008/0131262 A1 | 6/2008 | Lee et al. | |
| 2008/0131263 A1 | 6/2008 | Lee et al. | |
| 2008/0131264 A1 | 6/2008 | Lee et al. | |
| 2008/0206042 A1 | 8/2008 | Lee et al. | |

* cited by examiner

*Primary Examiner* — Caridad Everhart
(74) *Attorney, Agent, or Firm* — David J. Clement, Esq.; Trego, Hines & Ladenheim, PLLC

(57) ABSTRACT

A turbine shroud includes a shroud hanger having an arcuate panel from which three inner hooks extend inwardly, and from which two outer hooks extend outwardly therefrom. The two outer hooks effect a statically determinate configuration of the shroud.

21 Claims, 5 Drawing Sheets

US 8,147,192 B2

DUAL STAGE TURBINE SHROUD

The U.S. Government may have certain rights in this invention pursuant to contract number N00019-04-C0093 awarded by the U.S. Department of the Navy.

BACKGROUND OF THE INVENTION

The present invention relates generally to gas turbine engines, and, more specifically, to turbine shrouds therein.

In a gas turbine engine, air is pressurized in a compressor and mixed with fuel in a combustor for generating hot combustion gases. Energy is extracted from the gases in turbine stages which power the compressor, and also power an upstream fan in a turbofan gas turbine engine for aircraft applications.

The high pressure turbine (HPT) directly follows the combustor and receives the hottest temperature combustion gases therefrom, and is joined by one driveshaft to the rotor of the compressor for powering thereof during operation. A low pressure turbine (LPT) follows the HPT and includes several rotor stages joined by another driveshaft to the fan typically located forward of the compressor.

During operation, the rotor blades in the HPT extract energy to drive the corresponding rotor blades of the compressor. And, the rotor blades of the LPT extract energy to drive the fan blades conventionally with co-rotation of the turbine blades in the HPT and the LPT rotors.

Each turbine stage includes a turbine stator nozzle that preferentially directs the combustion gases through a cooperating row of turbine rotor blades. An annular turbine shroud surrounds each row of turbine blades and axially bridges the successive turbine nozzles.

The turbine shrouds are spaced closely adjacent to the radially outer tips of the turbine blades for minimizing the radial clearance or gap therebetween for maximizing engine efficiency.

Each turbine shroud is an assembly of components specifically configured for controlling the radial clearance between the shroud and blade tips as the engine operates during transient and steady state conditions. For example, during transient engine operation such as acceleration of the driveshafts during takeoff of the aircraft, the turbine components are heated and radially expand which correspondingly affects the blade tip clearance.

Accordingly, the design of modern turbine shrouds involves complex analysis and the consideration of competing objectives for controlling blade tip clearance while maximizing engine efficiency and life under the various thermal and mechanical stresses experienced by the shroud components.

In one engine design undergoing years of development, a common turbine shroud bridges the HPT and the LPT for certain advantages, but with associated disadvantages as well.

The typical turbine shroud includes a row of shroud segments with each segment having two supporting hooks that engage two corresponding inner hooks in a supporting hanger. The hanger also has two outer hooks supported in a pair of corresponding hooks of a surrounding shroud support. And that shroud support includes two corresponding rings which provide corresponding thermal mass that controls thermal expansion and contraction of the shroud support during transient engine operation.

In the development engine disclosed above, the two different turbine shrouds at the junction of the LPT and the HPT and their associated sets of supporting hook pairs are replaced by a common shroud segment having three supporting hooks which engage three inner hooks of the common hanger, with the common hanger having three outer hooks engaging three corresponding hooks in the shroud support, with the shroud support having three cooperating thermal control rings.

Although this three-hook integrated turbine shroud enjoys certain advantages for increasing engine performance, the mechanical and thermal design thereof is correspondingly more complex.

In particular, maintaining accurate clearance control of the common shroud segment with the two stages of turbine blades is more complex due to the integrated three-hook shroud support.

The three-hook shroud support configuration correspondingly has three different loadpaths therethrough which affect each other in a statically indeterminate manner.

Mechanical design requires detailed analysis of contact points and load transmission through the several sets of cooperating supporting hooks in the shroud assembly, which analysis is used for limiting mechanical and thermal stress during operation for maximizing durability for a correspondingly long useful life.

The three interrelated loadpaths through the multiple sets of cooperating support hooks in the turbine shroud effect redundancy in a statically indeterminate manner which correspondingly increases the variation in mechanical and thermal stress in the shroud components.

Such indeterminate shroud configuration can not only adversely affect the desired clearance control of the engine, but can lead to undesirably shortened shroud life when local stresses are higher than desired.

Accordingly, it is desired to provide an improved dual stage turbine shroud resolving this statically indeterminate problem.

BRIEF DESCRIPTION OF THE INVENTION

A turbine shroud includes a shroud hanger having an arcuate panel from which three inner hooks extend inwardly, and from which two outer hooks extend outwardly therefrom. The two outer hooks effect a statically determinate configuration of the shroud.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
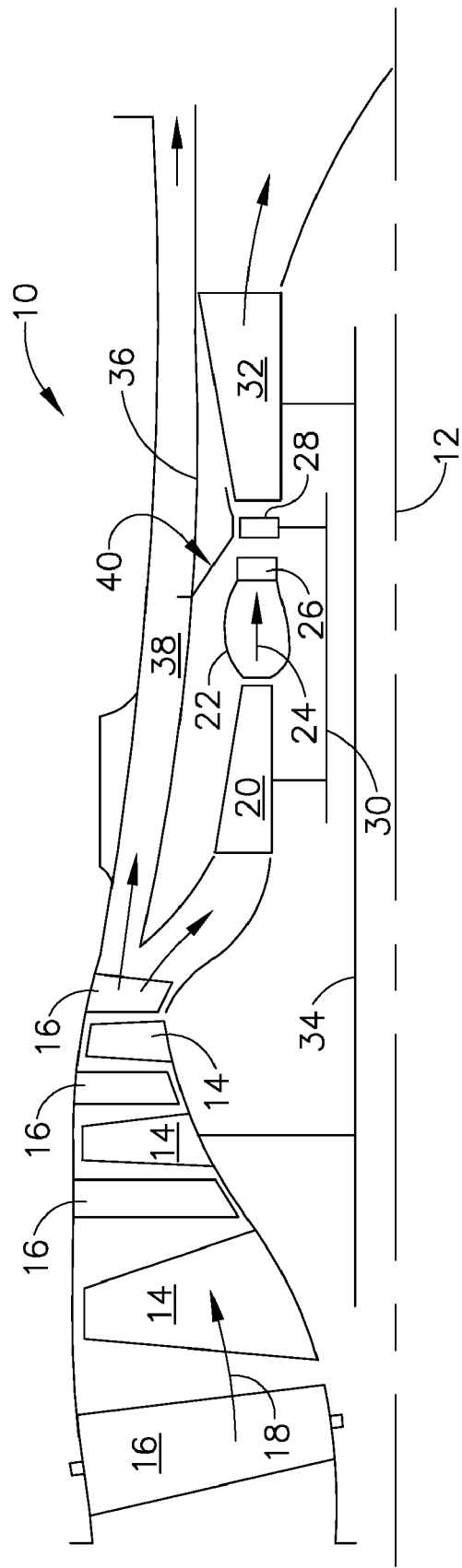
FIG. 1 is an axial schematic view of a turbofan aircraft gas turbine engine.

Illustrated schematically in FIG. 1 is an exemplary turbofan aircraft gas turbine engine 10 which is axisymmetrical about a longitudinal or axial centerline axis 12. The engine includes a three stage fan or fan rotor blades 14 and cooperating rows of guide vanes 16 which receive and pressurize ambient air 18 during operation.

A high pressure compressor 20 axially follows the fan for further pressurizing the air 18 which is then mixed with fuel in an annular combustor 22 for generating hot combustion gases 24 during operation.

A single stage high pressure turbine (HPT) follows the combustor 22 and includes a first stage high pressure stator nozzle 26 followed directly by a row of first stage high pressure turbine blades 28.

The blades 28 extend radially outwardly from a supporting rotor disk in a conventional configuration and are joined by a first driveshaft 30 to the corresponding rotor blades of the compressor 20 for powering thereof during operation.

A low pressure turbine (LPT) 32 follows the HPT and includes several stages of rotor blades conventionally joined to a second driveshaft 34, which in turn is joined to the several rows of fan blades 14 for powering thereof during operation.

A turbine casing 36 surrounds the core engine and LPT and defines an annular bypass duct 38 with the engine outer casing. The inner portion of fan air is suitably channeled to the compressor 20 during operation, with an outer portion of the fan air bypassing the core engine through the surrounding bypass duct 38.

Figure 2:
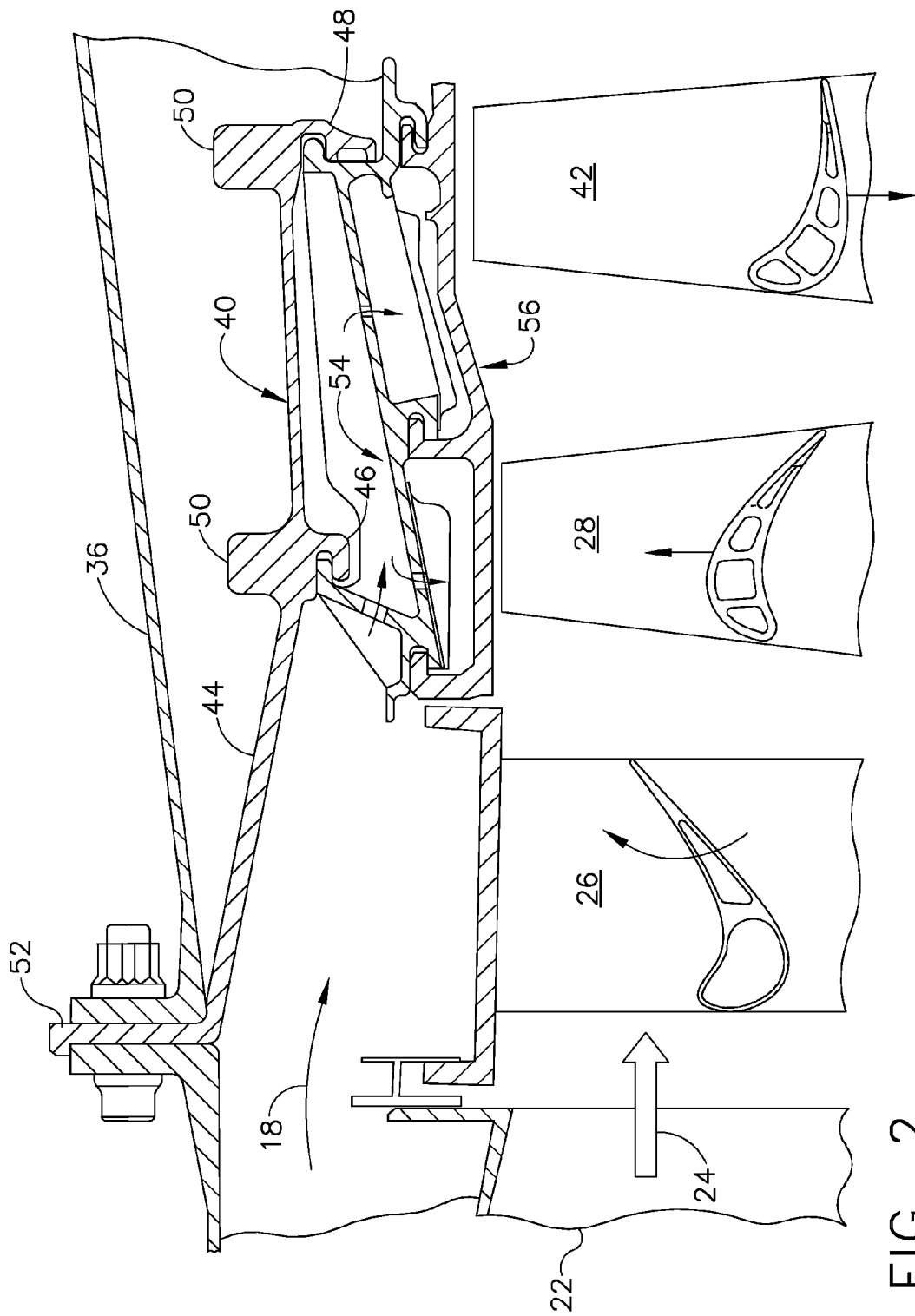
FIG. 2 is an enlarged axial sectional view through a portion of the turbine illustrated in FIG. 1.

In the exemplary turbofan engine illustrated in FIG. 1, a common turbine shroud 40 bridges adjacent rotor stages in the HPT and the LPT. FIG. 2 illustrates in more detail an improved configuration of the dual stage turbine shroud 40.

In particular, the LPT includes a row of first stage turbine rotor blades 42 directly following the single stage of HPT rotor blades 28, without an intervening turbine stator nozzle therebetween. Since this nozzle is eliminated in this preferred engine configuration, the HPT blades 28 and the first stage LPT blades 42 are configured with opposite profiles of their corresponding airfoils as illustrated schematically in FIG. 2.

The profile of the HPT blades 28 cooperates in a conventional manner with the corresponding, but opposite, profile of the airfoils in the stationary nozzle vanes 26 to effect rotation in one direction of the blades 28 with the convex suction sides thereof leading the circumferentially opposite concave pressure sides thereof.

Correspondingly, the aerodynamic profile of the first stage LPT blades 42 is opposite to that of the HPT blades 28 so that the blades 42 and attached driveshaft 34 rotate oppositely to the blades 28 and their attached driveshaft 30.

In FIG. 2, the corresponding suction sides of the two stages of turbine blades 28,42 face circumferentially opposite to each other for effecting counter-rotation of the two stages of the turbine blades 28,42, without an intervening stator nozzle therebetween. The opposite profiles of the blades 28,42 include corresponding twist relative to their radial axes for efficiently channeling the combustion gases 24 axially therethrough during operation for maximizing engine performance.

Correspondingly, the turbine shroud 40 is specifically configured to surround both stages or rows of turbine blades 28,42 to simultaneously control the radial tip clearance or gap therewith.

The turbine shroud 40 initially illustrated in FIG. 2 includes an annular shroud support or unitary tube 44 having a thin walled cylinder at its aft end from which extend radially inwardly a pair of forward and aft support hooks 46,48. These hooks face axially forwardly with corresponding horizontal ledges and circumferential slots in a conventional slot configuration.

The support tube 44 also includes a pair of integral thermal control rings 50 extending radially outwardly from the corresponding support hooks 46,48 to provide increased thermal mass to control thermal expansion and contraction of each hook during operation also in a conventional manner.

The support tube 44 includes a thin conical forward portion having a forward mounting flange 52 spaced axially forward from the two hooks 46,48 and suitably clamped or mounted in a bolted flange joint with the surrounding turbine casing 36. The support tube 44 accordingly extends axially aft inside the turbine casing 36 with the two thermal rings 50 and cooperating hooks 46,48 being cantilevered or suspended from the conical forward portion thereof. Since the support tube 44 is a fully annular unitary structure it provides a rigid and stable support for the additional components suspended within the turbine shroud assembly.

Suspended radially inside the support tube 44 is a row of shroud hangers 54. A plurality of the hangers circumferentially adjoin each other around the circumference of the support tube 44, and in one configuration there are fourteen such hangers 54 uniformly distributed around the circumference of the turbine shroud.

Correspondingly, a row of shroud segments 56 is suspended inside the row of hangers 54, with two shroud segments 56 being supported inside each of the fourteen hangers 54 in an exemplary configuration. The shroud segments 56 circumferentially adjoin each other for providing a fully annular shroud surrounding the two stages of turbine blades 28,42 for bounding the combustion gases 24 during operation and minimizing the radial clearance or gap with the blade tips.

Figure 3:
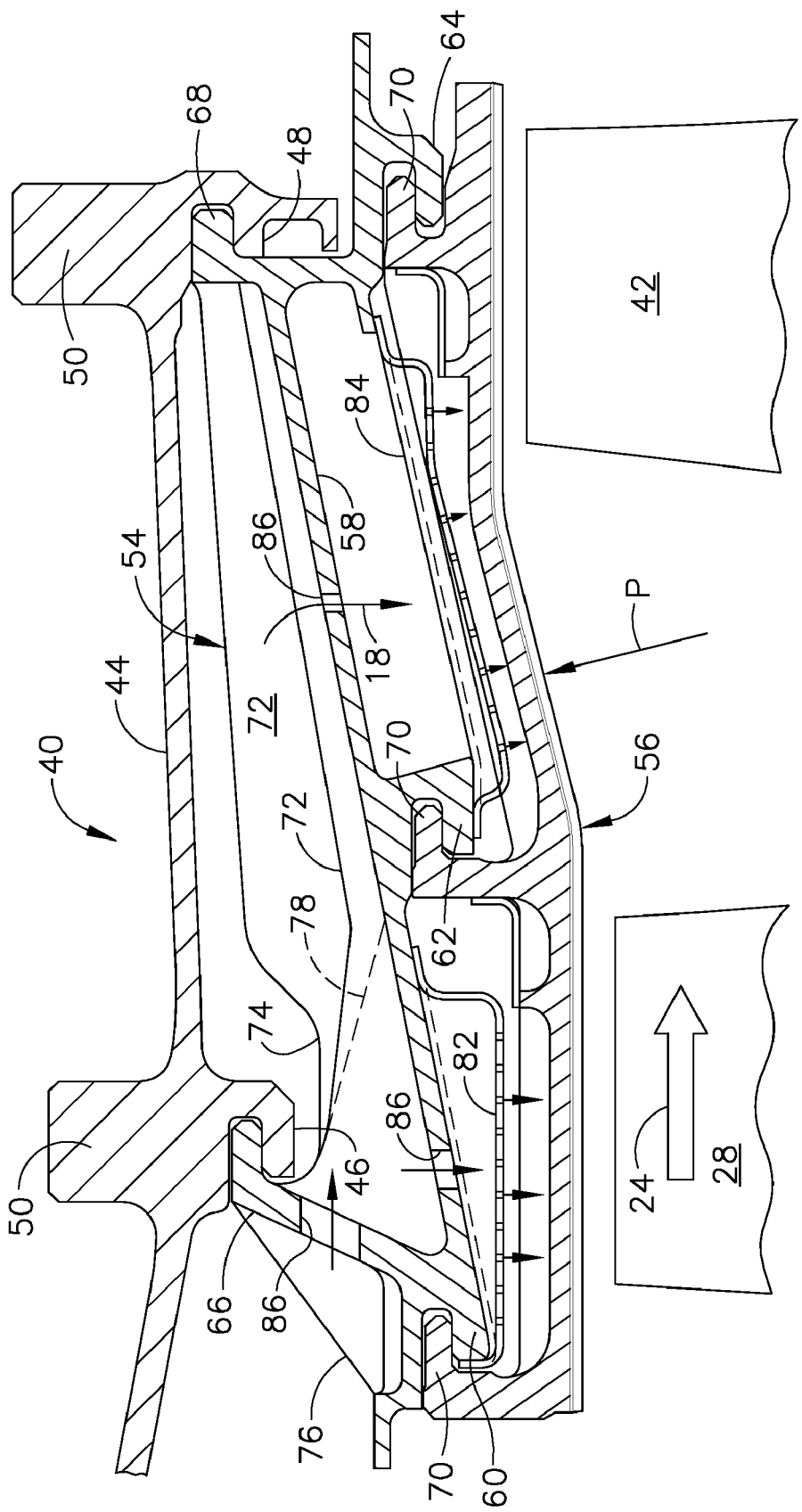
FIG. 3 is an enlarged axial sectional view of the dual stage turbine shroud illustrated in FIG. 2.
Figure 4:
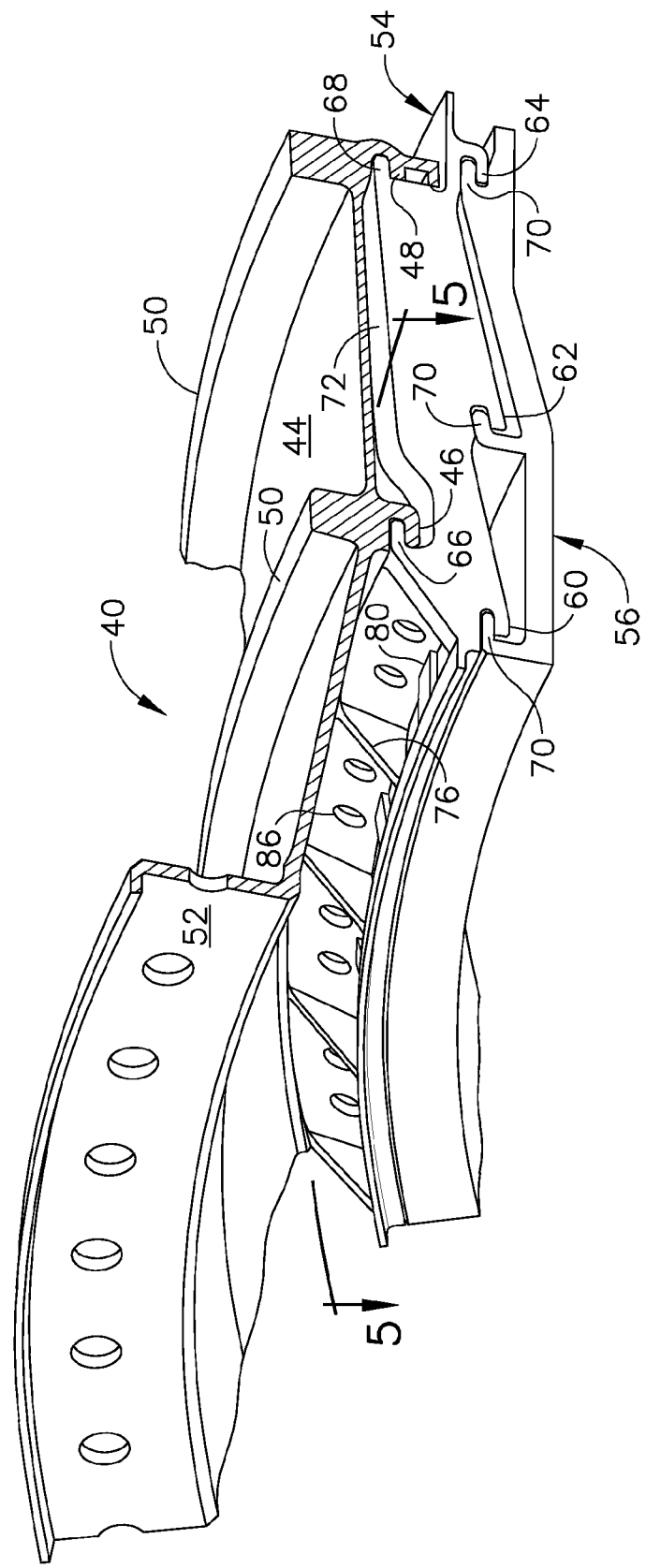
FIG. 4 is an isometric view of a portion of the turbine shroud illustrated in FIG. 3.
Figure 5:
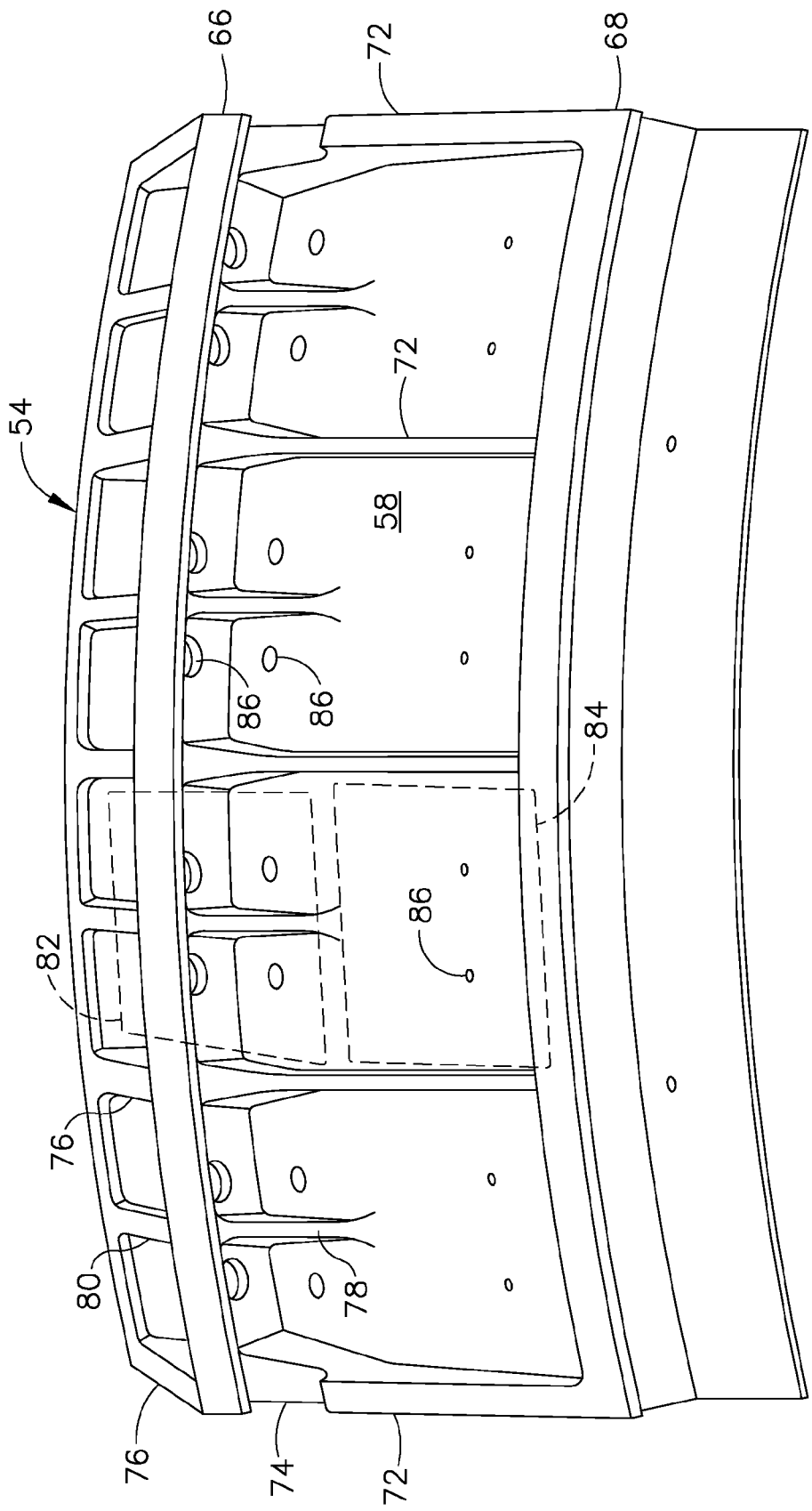
FIG. 5 is a top circumferential view of an exemplary shroud hanger illustrated in FIG. 4 and taken along line 5-5.

FIG. 3 is an enlarged axial sectional view of the turbine shroud 40 in more detail. FIG. 4 is an isolated isometric view of a portion of the turbine shroud 40. And, FIG. 5 is a top circumferential view of an exemplary hanger 54 in isolation from the shroud assembly.

Each shroud hanger 54 is circumferentially arcuate and includes a circumferentially arcuate thin panel 58 extending axially and circumferentially within the perimeter boundary thereof. The panel 58 includes three inner hooks 60,62,64 extending radially inwardly from the inner surface of the panel. And, from the radially opposite outer surface of the panel 58 only two outer hooks 66,68 extend radially outwardly from opposite axial ends thereof The shroud segment 56 illustrated in FIG. 3 is a thin panel member having suitably offset forward and aft ends for surrounding the two stages of blades 28,42 at different radial elevations. Each segment 56 includes three supporting hooks 70 at the axially forward and aft ends thereof and in the middle therebetween, which hooks extend radially outwardly in an otherwise conventional configuration of the shroud segment itself.

As shown in FIGS. 3 and 4, each shroud segment 56 is suspended radially inside a corresponding hanger 54, with the row of hangers in turn being supported or suspended from the surrounding shroud tube 44.

The shroud segment hooks 70 face axially aft to engage the corresponding axially forward facing inner hooks 60-64 of the hanger.

In turn, the aft facing outer hooks 66,68 of the hanger engage the forward facing hooks 46,48 of the tube 44 for suspending or supporting both the row of hangers and row of shroud segments.

The design of the various hooks disclosed above may be otherwise conventional except as modified hereinbelow, with each hook having a horizontal ledge extending from a radial stem to permit axial assembly of the cooperating hooks in tongue-and-groove fashion, with operating loads being carried primarily radially through the abutting ledges.

Although the shroud segment 56 itself retains the three hook design described above in the Background section which cooperate with the three inner hooks of the hanger, the outer hooks of the hanger and the supporting hooks of the support tube 44 have been selectively changed from the statically indeterminate three-hook design to a statically determinate two-hook design for providing corresponding improvements in clearance control, engine efficiency, durability, life, and reduction in overall weight of the turbine shroud.

Since there are twice as many shroud segments 56 as hangers 54, the operating loads from these segments are more readily distributed into the hangers, and since the fewer number of hangers carry the corresponding loads from the segments into the common support tube 44, the two-hook design thereof provides substantial advantages over the previous three-hook design in the original development.

However, the original three outer hook design of the hanger was dictated by the many competing design objectives in the integrated dual shroud design, and the elimination of any one set of hooks between the hangers and support tube requires suitable attention to the operating environment and loads to achieve a balanced design having improved performance and durability instead of decreased performance and durability.

More specifically, FIG. 3 illustrates in vertical or radial elevation the successive radial loadpaths from the shroud segment 56 with its three supporting hooks engaging the three lower hooks of the hanger, with the two hanger outer hooks engaging the corresponding two hooks of the supporting shroud tube 44.

Eliminating any one of the original three outer hooks from the hanger is problematic in view of the extensive longitudinal or axial length of the three-hook shroud segment for its dual stage configuration.

Eliminating any one of the three outer hooks correspondingly affects performance and durability of the entire shroud assembly, and such elimination therefore requires preferential modifications of the turbine shroud to ensure acceptable clearance control during transient and steady state operation thereof, as well as suitable durability with corresponding long life.

In the particular configuration illustrated in FIG. 3, the middle outer hook has been eliminated with corresponding changes in design for increasing the structural rigidity and integrity of the remaining two-outer hook design which supplants the three-outer hook design.

The shroud segment 56 retains its three-hook design to support its axially opposite ends over the corresponding dual turbine stages, with the middle hook also being retained for suitably supporting the otherwise flexible middle portion of the shroud segment between the opposite end hooks.

Correspondingly, the shroud hanger 54 retains its forward and aft inner hooks 60,64 disposed at opposite axial ends of the thin panel 58, with the middle inner hook 62 being disposed axially therebetween in the middle of the panel.

However, the panel outer hooks are limited in number to only the two forward and aft outer hooks 66,68 disposed at opposite axial ends of the panel, which two outer hooks are spaced axially forwardly and aft from the middle inner hook 62. The outer hooks 66,68 extend radially outwardly above the corresponding forward and aft inner hooks 60,62 for collectively supporting all three inner hooks 60-64, and the corresponding shroud segments 56 suspended therefrom.

During operation, the combustion gases 24 flowing past the turbine blades 28,42 operate under pressure which pressure creates a radially outward pressure force or load P over the inner surface of the shroud segments 56. This substantial pressure load is then carried radially outwardly through the three supporting hooks of the shroud segments and in turn to the three inner hooks of the shroud hangers.

However, these pressure loads must then be carried through only the remaining two outer hooks of the hanger into the corresponding two supporting hooks of the support tube 44.

Furthermore, the combustion gases flowing past the two turbine stages not only varies in pressure distribution but also varies in temperature. The temperature variation correspondingly creates differential temperatures throughout the shroud components with corresponding thermal loads, stress, and geometry changes.

Further complicating the pressure and thermal loading of the dual stage turbine shroud is the requisite cooling thereof provided by suitably channeling pressurized compressor discharge air 18 through the hanger itself to impingement cool the back or radially outer surface of the shroud segments in a suitable manner.

The resulting cooperation of the shroud segments and shroud hangers and common supporting tube 44 is therefore a complex mechanical assembly of components having complex pressure and load distributions, with a complex thermal distribution therethrough. The previous three-outer hook design of the hanger further increased the complexity of the design by effecting a statically indeterminate combination of elements which rendered difficult and inaccurate the prediction of contact loads and associated stresses.

The two-outer hook design illustrated in FIG. 3 preferentially eliminates one set of supporting hooks between the hanger and the tube, and also eliminates one of the three thermal rings 50 previously required, with a corresponding reduction in weight therefrom while effecting statically determinate assembly between the hanger and the tube.

However, in order to increase the structural rigidity and strength of the two-outer hook hanger upon the loss of the middle outer hook, a plurality of circumferentially or laterally spaced apart reinforcing girders 72 are incorporated to integrally bridge together the two outer hooks 66,68 along the intervening thin panel 58 therebetween. The girders 72 are illustrated in FIGS. 3-5, with FIG. 5 illustrating a top view thereof.

The several girders 72 effect axially extending ribs or beams which integrally bridge the two outer hooks 66,68 above and across the middle inner hook 62 and significantly increase the structural rigidity of the shroud hanger and its load carrying capability for not only the supported middle inner hook 62, but also the opposite end hooks 60,64.

The pressure loads acting on the shroud segments illustrated in FIG. 3 are suitably carried radially outwardly through the cooperating hooks to the axially spaced apart supporting hooks 46,48 of the tube 44. These pressure loads therefore introduce corresponding bending moments throughout the shroud components, including in particular the shroud hanger 54 itself. The preferentially configured girders 72 increase the strength and moment of inertia of the hanger for resisting such bending moments during operation to ensure desirable clearance control between the blade tips and the supported shroud segments.

The hanger panel 58 illustrated in FIGS. 3 and 5 has a generally uniform radial thickness in thin plate form for reducing weight between the locally enlarged inner and outer hooks 60,68. As shown in FIG. 5, the girders 72 preferably bridge the two outer hooks 66,68 along the perimeter of the thin panel 58 for increasing stiffness of the panel itself and the entire hanger.

In FIG. 5, two outside girders 72 are disposed along the circumferentially opposite ends or edges of the panel 58, with three suitably configured inside girders 72 being spaced generally equally therebetween. The five girders 72 therefore axially bridge the two outer hooks 66,68 over a substantial axial portion of the panel for increasing rigidity both axially as well as circumferentially in the integrated components.

As best shown in FIG. 3, the perimeter girders 72 are preferably coextensive in height or radial elevation with the aft outer hook 68, and also with the forward outer hook 66, but each includes an access pocket or recess 74 locally at the forward outer hook 66 for receiving the forward support hook 46 during assembly.

Since support hooks 46,48 extend radially inwardly from the support tube 44, the perimeter or outside girders 72 may have increased radial height to occupy the available radial space therebetween, with the local pocket 74 permitting engagement of the cooperating hooks 46,66 without interference or obstruction from the locally enlarged girders 72.

The two outer hooks 66,68 face axially aft with common radial elevation or height for engaging the cooperating two hooks 46,48 of the support tube which face axially forwardly.

Another feature for increasing the strength of the hanger 54 is the preferential configuration of the forward outer hook 66 which is radially taller than the short aft outer hook 68 due to the expanding flowpath of the combustion gases through the turbine stages. In particular, the forward outer hook 66 is inclined along its supporting stem axially aft toward the aft outer hook 68, which outer hook 68 extends radially outwardly without axial inclination.

FIG. 3 illustrates that all of the cooperating hooks in the turbine shroud assembly, except for the forward outer hook 66, extend solely radially outwardly without any axial inclination. In other words, the corresponding radial stems of the hooks extend radially outwardly and perpendicular to the axial centerline axis of the engine. And, the corresponding ledges of each hook extend horizontally or axially only to define the respective retention grooves.

In contrast, the forward outer hook 66 is inclined in the aft direction to create a conical section around the circumferential extent of the hanger for locally increasing strength of the hanger and to accommodate the loss of the middle outer hook.

In the specific embodiment illustrated in FIG. 3, the forward outer hook 66 commences at or above forward inner hook 60 at the forward axial end of the panel 58, and extends with axial inclination aft to about the middle of the axial spacing between the forward and middle inner hooks 60,62. In this way, the forward outer hook 66 is inclined aft and short of the middle inner hook 62 and locally increases the structural rigidity axially therebetween.

FIG. 3 also illustrates in the exemplary embodiment that each hanger 54 also includes a plurality of gussets 76,78 integrally bridging the inclined forward outer hook 66 to the panel 58. Each hanger 54 has a complex configuration both axially and circumferentially with the various inner and outer hooks and reinforcing girders and gussets which may be suitably manufactured using conventional casting of suitable metal alloys for use in the hot environment of the turbine shroud.

The forward gussets 76 have triangular configurations and integrally bridge the forward surface of the forward outer hook 66 to the forward inner hook 60 of the hanger 54 to substantially increase the local rigidity of the forward end of the hanger. The aft gussets 78 are also triangular in configuration and integrally bridge the aft surface of the forward outer hook 66 to the middle inner hook 62 for additionally increasing the rigidity of the hanger between the forward outer hook and the underlying forward and middle inner hooks.

The forward and aft gussets 76,78 illustrated in FIG. 3 are as tall as practical, with the former extending to the top ledge of the forward outer hook 66, and the latter extending closely thereto below the pocket 74 to provide access for the forward hook 46. The forward gusset 76 extends forwardly to the leading edge of the hanger and integrally with the base of the forward inner hook 60. The aft gusset 78 extends integrally along the panel 58 to the base of the middle inner hook 62 for increasing the structural rigidity therewith.

Whereas the aft gussets 78 extend aft from the forward outer hook 66 and terminate near the middle inner hook 62, the cooperating girders 72 also commence at the forward outer hook 66 but preferably extend the entire axial length to the aft surface and top ledge of the aft outer hook 68.

FIG. 5 illustrates the cooperating arrangement of the stiffening girders 72 and gussets 76,78 over the outer surface of the hanger panel 58. The forward gussets 76 are preferably coaxially aligned with corresponding ones of the girders 72 on opposite sides of the forward outer hook 66.

Correspondingly, the aft gussets 78 are spaced circumferentially between adjacent girders 72. And, additional short ribs 80 may be aligned coaxially with the aft gussets 78 on the opposite forward side of the forward outer hook 66 circumferentially between adjacent forward gussets 76.

FIG. 5 clearly illustrates the selective introduction of the girders 72, gussets 76,78, and reinforcing ribs 80 all cooperating with the axially inclined forward outer hook 76 to suitably bridge together the forward and aft outer hooks 66,68 in the two-outer hook configuration of the statically determinate hanger 54.

In this way, the improved dual-stage shroud enjoys reduced weight from the elimination of the middle hook set and thermal ring, while maintaining accurate clearance control of the supported shroud segments, with predictable contact loads and operating stresses for corresponding durability and improved performance.

Other features of the hanger and shroud segments may be conventional, including the cooling configurations thereof. For example, a forward impingement baffle 82 may extend radially inwardly from the hanger panel 58 between the forward and middle inner hooks 60,62. An aft impingement baffle 84 may extend radially inwardly from the panel 58 between the middle and aft inner hooks 62,64.

The impingement baffles may be formed of thin sheet metal suitably brazed to the hanger panel 58, and perforated with a multitude of impingement holes for channeling the cooling air 18 in impingement against the back, outer side of the shroud segment 56 during operation.

As shown in FIG. 5, the five axial girders 72 are spaced circumferentially apart from each other to define four corresponding backside pockets above the panel 58. And, four of the forward baffles 82 and four of the aft baffles 84 may be located behind the corresponding pockets on opposite sides of the middle inner hook 62.

The hanger 54 as illustrated in FIGS. 3 and 5 includes suitable apertures or holes 86 for channeling the cooling air therethrough to enter the impingement baffles. A row of axial air holes 86 is provided axially through the radial stem of the forward outer hook 66, and additional radial holes 86 are provided through the panel 58 itself to feed the corresponding baffles 82,84. Other cooling features may be introduced in the turbine shroud as desired for maximizing cooling performance as well as clearance control capability thereof.

The resulting turbine shroud 40 illustrated in FIG. 3 is a combination of components having increased axial length to cover the two stages of counter-rotation turbine blades 28,42 disposed inside the shroud segment 56 common thereto. The axially long shroud segments 56 are suitably mounted with three hooks to the correspondingly axially long shroud hanger 54, with in turn is mounted to the two-hook and two-ring shroud support tube 44. This statically determinate dual stage turbine shroud includes preferentially configured components for improving clearance control at reduced weight and suitable durability of the components.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine shroud comprising:
   a support tube including a pair of support hooks extending radially inwardly and a pair of rings extending radially outwardly from said pair of support hooks;
   a hanger including only two outer hooks extending radially outwardly in engagement with said pair of support hooks, and further including three inner hooks extending radially inwardly, said hanger further including a panel having said outer hooks at opposite axial ends thereof, wherein said three inner hooks are collectively supported by said two outer hooks, and wherein said panel includes a plurality of girders bridging said two outer hooks above said three inner hooks; and
   a shroud segment including three shroud hooks extending radially outwardly in engagement with said three hanger inner hooks.

2. A shroud according to claim 1 wherein said outer hooks include a forward outer hook inclined axially aft toward an aft outer hook, and said aft outer hook extends radially without axial inclination.

3. A shroud according to claim 2 wherein said hanger further comprises a plurality of gussets bridging said inclined forward outer hook to said panel.

4. A shroud according to claim 3 wherein said gussets comprise forward gussets bridging said forward outer hook to a forward inner hook of said hanger, and aft gussets bridging said forward outer hook to a middle inner hook of said hanger.

5. A shroud according to claim 3 wherein some of said gussets are coaxially aligned with said girders on opposite sides of said forward outer hook, and some of said gussets are spaced circumferentially between said girders.

6. A shroud according to claim 3 wherein said forward outer hook commences at a forward inner hook of said hanger and is inclined aft axially short of the next inner hook of said hanger.

7. A shroud according to claim 3 wherein said panel has a uniform thickness between said inner and outer hooks, and said girders bridge said outer hooks along the perimeter of said panel for increasing stiffness thereof.

8. A shroud according to claim 7 wherein:
   said outer hooks face aft with common elevation; and
   said perimeter girders are coextensive in elevation with said aft outer hook, and include an access pocket at said forward outer hook.

9. A turbine shroud comprising a shroud hanger including an arcuate panel having three inner hooks extending inwardly, and only two outer hooks extending outwardly therefrom, wherein said inner hooks include forward and aft inner hooks disposed at said opposite axial ends of said panel, and a middle inner hook disposed axially therebetween; and said outer hooks include forward and aft outer hooks spaced axially from said middle hook and extending outwardly above said forward and aft inner hooks for collectively supporting said three inner hooks, and wherein said panel includes a plurality of girders bridging said two outer hooks across said middle inner hook.

10. A shroud according to claim 9 wherein said forward outer hook is inclined aft toward said aft outer hook.

11. A shroud according to claim 10 wherein said forward outer hook commences at said forward inner hook and extends aft short of said middle inner hook.

12. A shroud according to claim 10 wherein said hanger further comprises a plurality of forward gussets bridging said forward outer hook to said forward inner hook.

13. A shroud according to claim 12 wherein said hanger further comprises a plurality of aft gussets bridging said forward outer hook to said middle inner hook.

14. A shroud according to claim 10 wherein said panel has a uniform thickness between said inner and outer hooks, and said girders bridge said outer hooks along the perimeter of said panel for increasing stiffness thereof.

15. A shroud according to claim 14 wherein:
   said outer hooks face aft with common elevation; and
   said perimeter girders are coextensive in elevation with said aft outer hook, and include an access pocket at said forward outer hook.

16. A shroud according to claim 14 wherein said hanger further includes a forward impingement baffle extending inwardly between said forward and middle inner hooks and an aft impingement baffle extending inwardly between said middle and aft inner hooks.

17. A shroud according to claim 10 further comprising a shroud support tube including a pair of support hooks engaged respectively with said hanger outer hooks.

18. A shroud according to claim 17 wherein said support tube further includes a pair of rings extending radially outwardly from said support hooks.

19. A shroud according to claim 18 wherein said support tube further includes a forward mounting flange spaced axially forward from said support hooks.

20. A shroud according to claim 18 further comprising a shroud segment suspended from said hanger inner hooks.

21. A shroud according to claim 20 further comprising two stages of counter-rotation turbine blades disposed inside said shroud segment being common thereto.

* * * * *